US010097867B2

(12) United States Patent
Bettendorf et al.

(10) Patent No.: US 10,097,867 B2
(45) Date of Patent: Oct. 9, 2018

(54) SYSTEMS AND METHODS FOR PROVIDING A RATINGS VERSION AND A DYNAMIC AD VERSION OF A VIDEO

(71) Applicant: Disney Enterprises, Inc., Burbank, CA (US)

(72) Inventors: Ramzi Bettendorf, Long Beach, CA (US); Shant Mardigian, La Crescenta, CA (US); Xinh Le, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/949,721

(22) Filed: Nov. 23, 2015

(65) Prior Publication Data

US 2017/0078719 A1    Mar. 16, 2017

Related U.S. Application Data

(60) Provisional application No. 62/218,083, filed on Sep. 14, 2015.

(51) Int. Cl.
| | |
|---|---|
| *H04N 21/2343* | (2011.01) |
| *H04N 21/239* | (2011.01) |
| *H04N 21/8358* | (2011.01) |
| *H04N 21/858* | (2011.01) |
| *H04N 21/81* | (2011.01) |
| *H04N 21/234* | (2011.01) |
| *H04N 21/262* | (2011.01) |
| *H04N 21/472* | (2011.01) |

(52) U.S. Cl.
CPC ... *H04N 21/23439* (2013.01); *H04N 21/2393* (2013.01); *H04N 21/23424* (2013.01); *H04N 21/26241* (2013.01); *H04N 21/47202* (2013.01); *H04N 21/812* (2013.01); *H04N 21/8358* (2013.01); *H04N 21/8586* (2013.01)

(58) Field of Classification Search
None
See application file for complete search history.

(56) References Cited

U.S. PATENT DOCUMENTS

| | | | | |
|---|---|---|---|---|
| 6,721,953 B1 * | 4/2004 | Bates | ................. | H04N 5/44543 348/E5.102 |
| 7,010,801 B1 * | 3/2006 | Jerding | .............. | H04N 7/17318 348/E7.073 |
| 7,464,392 B2 * | 12/2008 | Sie | ......................... | G06Q 30/02 348/E7.073 |
| 7,546,619 B2 | 6/2009 | Anderson | | |

(Continued)

*Primary Examiner* — An Son P Huynh
(74) *Attorney, Agent, or Firm* — Farjami & Farjami LLP (57) ABSTRACT

There are provided systems and methods for providing a ratings version and a dynamic ad version of a video using a system having a non-transitory memory and a hardware processor. In an exemplary system, the hardware processor executes an executable code stored in the memory to receive a request for a video over a network, determine a time elapsed since a first broadcast of the video, provide a ratings version of the video over the network for display on the display device if the time elapsed since the first broadcast of the video is not greater than a threshold, and provide a dynamic ad version of the video over the network for display on a display device if the time elapsed since the first broadcast of the video is greater than the threshold.

16 Claims, 4 Drawing Sheets

(56) References Cited

U.S. PATENT DOCUMENTS

| | | | |
|---|---|---|---|
| 7,739,153 B1* | 6/2010 | Anderson et al. | G06Q 30/00 705/26 |
| 7,962,935 B2* | 6/2011 | Kurosaki | H04H 20/76 725/39 |
| 8,458,745 B2* | 6/2013 | Shanks | H04H 60/31 725/14 |
| 8,484,679 B1* | 7/2013 | Chtchedrina | H04N 21/8541 725/37 |
| 8,516,529 B2 | 8/2013 | Lajoie | |
| 8,621,531 B2 | 12/2013 | Casey | |
| 8,718,445 B1* | 5/2014 | Berger | G06Q 30/0261 386/239 |
| 8,838,748 B2 | 9/2014 | Nair | |
| 8,863,198 B2 | 10/2014 | Sirpal | |
| 8,929,718 B2 | 1/2015 | Griffin | |
| 9,258,579 B1* | 2/2016 | Reeves | H04N 21/23439 |
| 2002/0056087 A1* | 5/2002 | Berezowski | G06Q 30/02 725/9 |
| 2002/0083443 A1* | 6/2002 | Eldering | G06Q 30/02 725/34 |
| 2002/0085090 A1* | 7/2002 | Kamen | H04N 5/44543 348/61 |
| 2002/0157099 A1 | 10/2002 | Schrader | |
| 2002/0166120 A1* | 11/2002 | Boylan, III et al. | H04N 7/10 725/35 |
| 2004/0221311 A1* | 11/2004 | Dow | G06F 17/30784 725/52 |
| 2005/0149964 A1* | 7/2005 | Thomas | G06Q 30/02 725/9 |
| 2007/0136753 A1* | 6/2007 | Bovenschulte | H04H 60/31 725/46 |
| 2007/0154168 A1* | 7/2007 | Cordray | H04N 5/76 386/230 |
| 2007/0168483 A1* | 7/2007 | Lunt et al. | G06F 15/173 709/223 |
| 2008/0060005 A1 | 3/2008 | Shanks | |
| 2008/0140524 A1* | 6/2008 | Anand | G06Q 30/02 705/14.66 |
| 2009/0133078 A1* | 5/2009 | Hamano | H04N 5/76 725/87 |
| 2009/0158354 A1* | 6/2009 | Rodriguez | H04N 5/44543 725/60 |
| 2010/0153885 A1* | 6/2010 | Yates | G06F 3/0482 715/841 |
| 2011/0279311 A1* | 11/2011 | Hamano | G06F 17/30241 342/357.25 |
| 2012/0185895 A1 | 7/2012 | Wong | |
| 2012/0317188 A1* | 12/2012 | Fredricksen | H04L 29/08729 709/203 |
| 2013/0031582 A1* | 1/2013 | Tinsman et al. | H04N 21/236 725/36 |
| 2013/0064524 A1* | 3/2013 | Griffin | H04N 21/2407 386/262 |
| 2013/0167168 A1* | 6/2013 | Ellis | H04N 5/44543 725/12 |
| 2015/0325268 A1* | 11/2015 | Berger | G11B 27/19 386/248 |

* cited by examiner

SYSTEMS AND METHODS FOR PROVIDING A RATINGS VERSION AND A DYNAMIC AD VERSION OF A VIDEO

RELATED APPLICATION(S)

The present application claims the benefit of and priority to a U.S. Provisional Patent Application Ser. No. 62/218,083, filed Sep. 14, 2015 and titled "Workflow Enhancement for Video-On-Demand (VOD) Over Packet Network," which is hereby incorporated by reference in its entirety into the present application.

BACKGROUND

Traditionally, satellite and cable providers receive a long form episode or movie files from a content creator or provider with baked-in advertisement (ad) breaks for airing on the satellite or cable channels. Typically, on the fourth day after airing this original version of the episode or movie, a new long form version of the episode or movie replaces the original version in the satellite/cable provider's on-demand library. Conventionally, content creators or providers fill the ad breaks of the new version with generic or baked-in promo inventory, such as ads that promote their family of network's programming.

SUMMARY

The present disclosure is directed to systems and methods for providing a ratings version and a dynamic ad version of a video, substantially as shown in and/or described in connection with at least one of the figures, as set forth more completely in the claims.

DETAILED DESCRIPTION

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
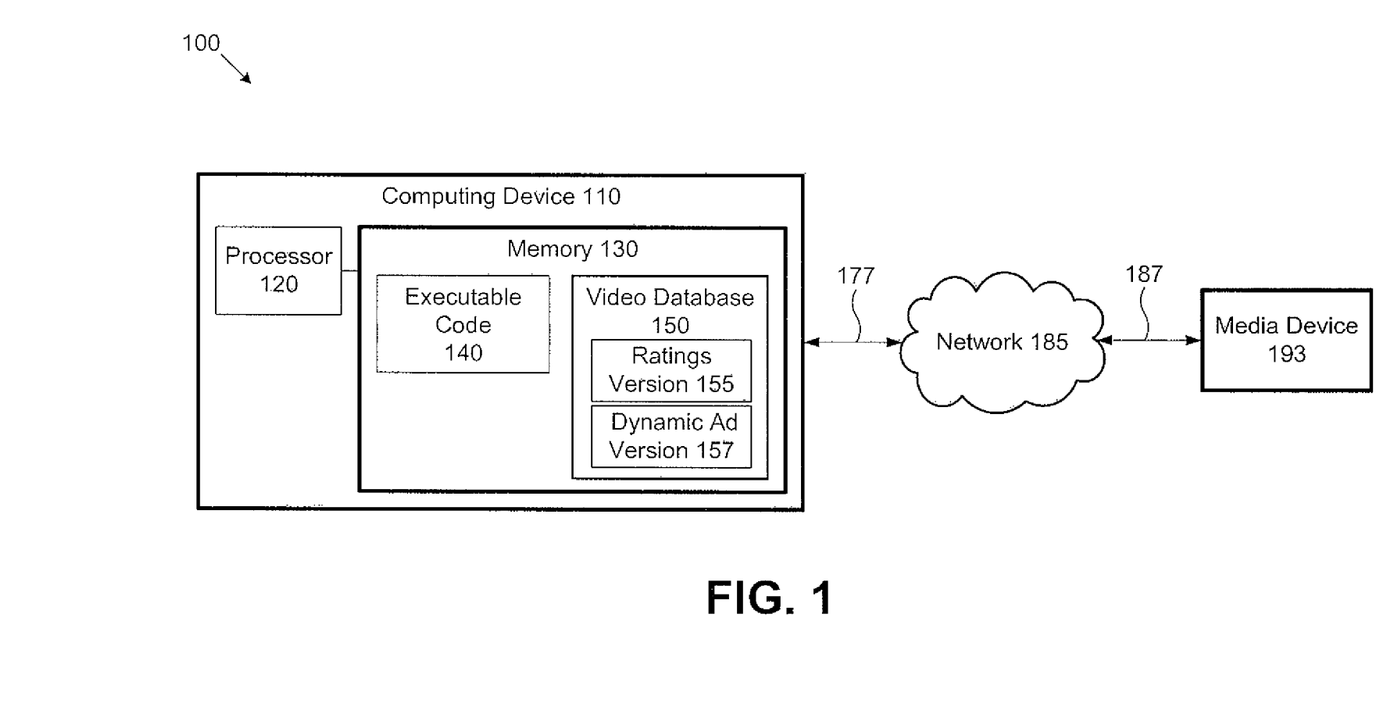
FIG. 1 shows a diagram of an exemplary system for providing a ratings version and a dynamic ad version of a video, according to one implementation of the present disclosure.

FIG. 1 shows a diagram of an exemplary system for providing a ratings version and a dynamic ad version of a video, according to one implementation of the present disclosure. System 100 includes computing device 110, network 185, and media device 193. Computing device 110 includes processor 120 and memory 130. Processor 120 is a hardware processor, such as a central processing unit (CPU) used in computing devices. Memory 130 is a non-transitory storage device for storing computer code for execution by processor 120, and also storing various data and parameters. Memory 130 includes executable code 140 and video database 150.

Executable code 140 is an executable code stored in memory 130 for execution by processor 120 to provide videos to media device 193 over network 185. Executable code 140 may receive a request for a video from media device 193 and check for the availability of the requested video in video database 150, filter the available videos based on criteria such as an time elapsed since a first broadcast of the video, and provide the media device access to the video over the network. In some implementations, executable code 140 may additionally retrieve configurations from video database 150, such as media content configurations and/or media device configurations, and apply the configurations to the video and/or media device 193. In some implementations, executable code 140 may insert advertisements into advertisement blocks of dynamic ad version 157. Advertisements inserted into advertising blocks of dynamic ad version 157 may be different advertisements than those that were included in ratings version 155, and may include new advertisements, e.g., network specific advertisements. Executable code 140 may make real-time updates to the catalog of videos available in video database 150.

Video database 150 is a database storing a plurality of videos and may comprise a video library of a content provider. Video database 150 may include different versions of a video, such as ratings version 155 and dynamic ad version 157. Ratings version 155 may be a video with advertisements included, such that ratings version 155 is substantially the same as a version of the video that is broadcast by a broadcast company, such as an over-the-air broadcast network, a cable broadcast network, a satellite broadcast network, etc. In some implementations, ratings version may include an identifying feature to enable tracking of the number of times the video is viewed, such as an audio watermark or any other watermark. An audio watermark may be an electronic identifier embedded in an audio signal, and may be used to track ratings for videos such as television shows. In some implementations, ratings version 155 may include a Nielson watermark. The ratings version of a video, such as ratings version 155, may be broadcast during a time window following the first broadcast of the video, which may be three days, and ratings version 155 may be referred to as a C3 asset. Video database 150 may be on a media server, and in some implementations, may be on a separate media server such as a cloud server.

Dynamic ad version 157 may be a video with no advertisements included. In some implementations, dynamic ad version 157 may include a plurality of advertisement blocks where advertisements were included in the original version that is broadcast by a broadcast company. Dynamic ad version 157 may include blank spaces identifying where executable code 140 may insert advertisements and may be referred to as a clean version of the video or a clean asset that carries neither the audio watermark, nor the advertisements or advertisers made available in the original asset. The clean version of a video may be broadcast after the window for measuring television ratings has passed, which may be three days, and dynamic ad version 157 may be referred to as a D4 asset. In some implementations, each playback of dynamic ad version 157 may include a unique combination of advertisements and may present a unique advertisement experience. In other implementations, dynamic ad version 157 may be a clean version of the video that does not carry any advertising or promotional messaging with only blank spaces where the advertising breaks occur, enabling the content provider to choose and insert advertisements or provide the video without advertisements. Dynamic ad version 157 may additionally be used as a fallback video to ensure that a version of a video will be available when requested by media device 193. In some implementations, dynamic ad version 157 may be provided without advertisements, for example, to a customer with a paid subscription providing access to advertisement-free shows.

Network 185 is a computer network, such as a packet network, e.g. the Internet. Computing device 110 may communicate with network 185 via communication link 177, and media device 193 may communicate with network 185 via communication link 187. In some implementations, communication link 177 may include a wired connection and/or a wireless connection. In some implementations, communication link 187 may include a wired connection and/or a wireless connection. Media device 193 is a device suitable for receiving videos, such as ratings version 155 and dynamic ad version 157. In some implementations, media device 193 may be a set-top box, such as a cable provider set-top box or a satellite provider set-top box. In other implementations, media device 193 may be a television, a smart television, a computer, a tablet computer, a smart phone, or other network connectable device capable of receiving video. Media device 193 may include a display suitable for displaying video content including ratings version 155 and/or dynamic ad version 157. In some implementations, the display may include a television, a computer monitor, a tablet computer, the display of a smart phone, etc.

Figure 2:
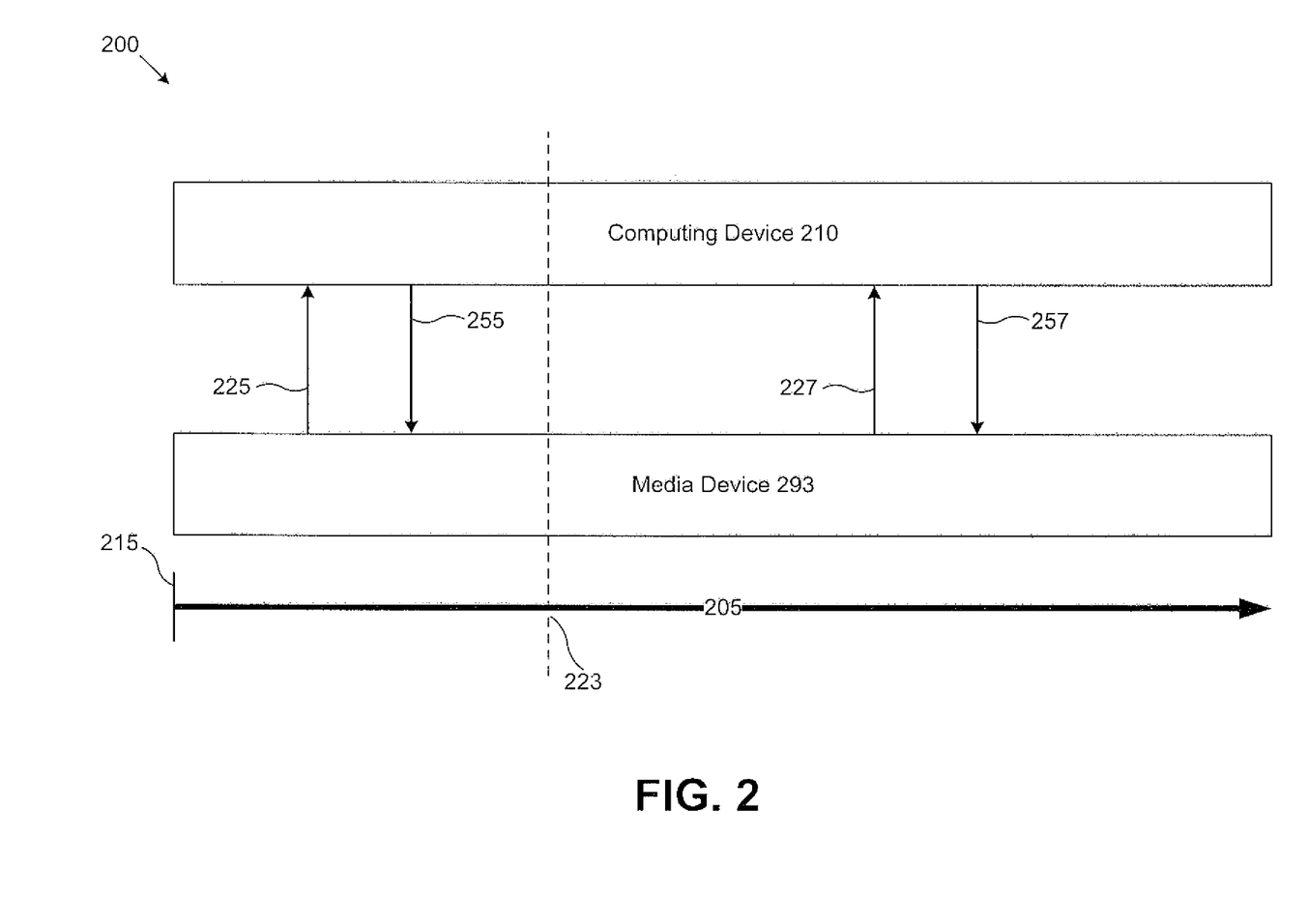
FIG. 2 shows an exemplary timeline depicting use of the system of FIG. 1, according to one implementation of the present disclosure.

FIG. 2 shows an exemplary timeline depicting use of the system of FIG. 1, according to one implementation of the present disclosure. Diagram 200 shows timeline 205 which begins at first broadcast time 215, representing the first broadcast of the video on a broadcast network. In some implementations, first broadcast time 215 may be the time from which ratings are measured for the video. For example, some television ratings may be measured from the first time a video is broadcast and include subsequent video on demand (VOD) viewings for three days or any predetermined period of time after the first broadcast time.

According to FIG. 2, video request 225 by media device 293 to computing device 210 occurs after first broadcast time 215, but before threshold time 223. In response, processor 120 executes executable code 140 to search video database 150 for the requested video, and because video request 225 has occurred before threshold time 223, computing device 210 returns ratings version 255 to media device 293. FIG. 2 also shows video request 227 by media device 293 to computing device 210, which occurs after threshold time 223. In response, processor 120 executes executable code 140 to search video database 150 for the requested video, and because video request 22 has occurred after threshold time 223, computing device 210 returns dynamic ad version 257 to media device 293.

Figure 3:
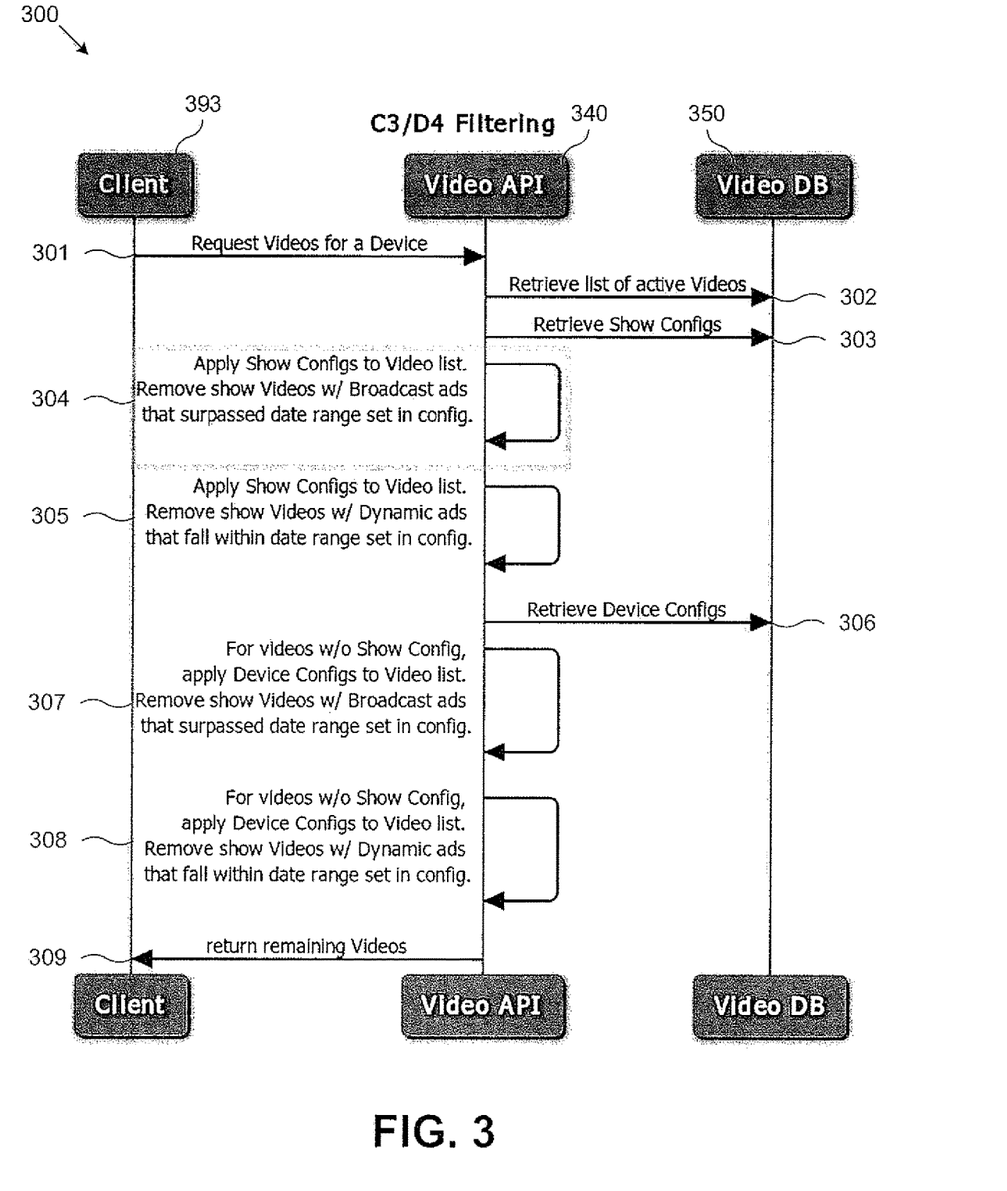
FIG. 3 shows a flowchart illustrating an exemplary method of providing a ratings version and a dynamic ad version of a video, according to one implementation of the present disclosure.

FIG. 3 shows a flowchart illustrating an exemplary method of providing a ratings version and a dynamic ad version of a video, according to one implementation of the present disclosure. Diagram 300 includes client 393 corresponding to media device 193, video application program interface (API) 340 provided by executable code 140 of computing device 110, and video DB 350 corresponding to video database 150 of computing device 110.

At 301, client 393 sends a request for a video to computing device 110 via video API 340. In some implementations, a user may initiate the request by selecting a video from a library of videos offered by a content provider, such as over-the-air broadcast network, a cable broadcast network, a satellite broadcast network, etc., and may be a video that is used to measure television ratings. Each video on in video DB 350 may include a unique identifier, such as an external unique episode identification (ID). External unique episode IDs may be unique identifiers for TV programs and movies, such as a Tribune Media Services (TMS) ID, and may allow client 393 to schedule data and on-demand Video catalogs, such as video DB 350.

At 302, processor 120 of computing device 110 retrieves a list of active videos from video database 350. The list may include videos with broadcast advertisements, such as ratings version 155, and videos with blank advertisement blocks, such as dynamic ad version 157. In some implementations, the list of active videos retrieved from video DB 350 may include multiple versions of the same video. For example, the list of active videos may include a ratings version of a first video for use before a threshold and a dynamic ad version of the first video for use after the threshold.

At 303, processor 120 of computing device 110 retrieves show configurations from video database 150. In some implementations, show configurations may include a threshold for measuring ratings of the requested video, or the configurations may include a date range for showing a rating calculation version of the video, such as ratings version 155, and excluding dynamic advertisement versions, such as dynamic ad version 157. The threshold may be a time after a content provider first broadcasts a video before which the content provider may receive ratings credit for each viewing of the video.

At 304, processor 120 of computing device 110 applies the show configurations as a filter to the list of active videos retrieved from video BD 150. In some implementations, one or more of the videos of the list of active videos retrieved from video DB 150 may include broadcast advertisements. Processor 120 of computing device 110 may filter out shows with broadcast advertisements, such as ratings version 155, from the list of active videos if the video has surpassed the date range set in the show configurations. For example, processor 120 of computing device 110 may filter out or remove a ratings version, such as ratings version 155, video having a date range or threshold of three days if the time elapsed since the video was first broadcast is greater than three days.

At 305, processor 120 of computing device 110 applies the show configurations as a filter to the list of active videos remaining after ratings version videos surpassing the date range set in the show configurations have been removed. In some implementations, one or more of the videos of the list of active videos retrieved from video database 150 may include dynamic advertisements. Processor 120 of computing device 110 may filter out or remove videos with dynamic advertisements, such as dynamic ad version 157, from the list of active videos if the video is within the date range set in the show configurations. For example, processor 120 of computing device 110 may remove a video, such as dynamic ad version 157, having a date range or threshold of three days if the time elapsed since the video was first broadcast is less than three days and the video includes dynamic advertisements.

In the event that video DB 350 does not have show configurations for the show, processor 120 of computing device 110 may retrieve device configurations from video DB 350 and may apply the device configurations to the list of active videos. At 306, processor 120 of computing device 110 retrieves device configurations from video DB 350. Device configurations may enable device-level control of playback of videos from video database 150. In some implementations, device configurations may not enable processor 120 of computing device 110 from playing an available ratings version of a show, such as ratings version 155, or device configurations may include settings allowing processor 120 of computing device 110 to play shows including advertisements that are within a date range, such as ratings version 155.

Device configurations may include a date range during which to display broadcast advertisements and a date range during which to display advertisements dynamically inserted into the show. In some implementations, the device configurations may include a threshold for measuring ratings of the requested video, or the device configurations may include a date range for showing a rating calculation version of the video, such as ratings version 155, and excluding dynamic advertisement versions, such as dynamic ad version 157. In some implementations, processor 120 of computing device 110 may remove from the video list those shows with broadcast ads that have surpassed the date range set in the device configurations. In some implementations, processor 120 of computing device 110 may apply the device configurations to the list of active videos to remove from the video list those shows with dynamic ads that fall within the date range set in the device configuration.

At 307, processor 120 of computing device 110 applies device configurations as a filter to the active video list. In some implementations, one or more videos remaining on the active video list may not include show configurations. Video API 340 may remove or filter out videos with dynamic advertisements, such as dynamic ad version 157, from the list of active videos if the video is within the date range set in the show configurations.

At 308, processor 120 of computing device 110 applies device configurations as a filter to the active video list. In some implementations, one or more videos remaining on the active video list may not include show configurations and may include dynamic advertisements. Video API 340 may remove or filter out videos with dynamic advertisements, such as dynamic ad version 157, from the list of active videos if the video is within the date range set in the device configurations.

At 309, processor 120 of computing device 110 provides the remaining list of active videos to client 393. In some implementations, providing the remaining videos to client 393 may include transmitting ratings version 155 and/or dynamic ad version 157 to client 393. Providing the remaining list of active videos to client 393 may include streaming ratings version 155 and/or dynamic ad version 157 to client 393. In other implementations, providing the remaining videos to client 340 may include transmitting a verifiable token to client 393, such as a uniform resource locator (URL) to access the requested video. The URL may be a limited access URL and may expire after an access window, such as one minute, two minutes, five minute, etc.

Figure 4:
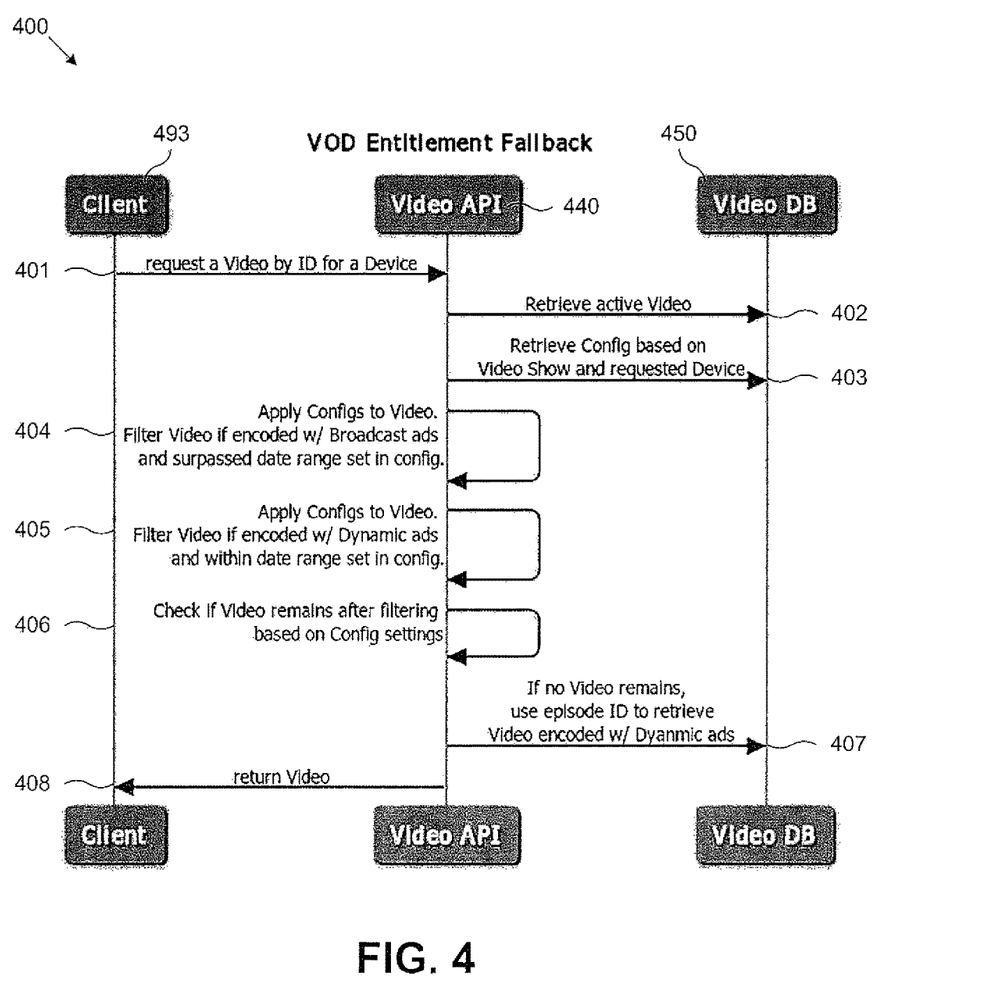
FIG. 4 shows a flowchart illustrating an exemplary method of providing a ratings version and a dynamic ad version of a video, according to one implementation of the present disclosure.

FIG. 4 shows a flowchart illustrating an exemplary method of providing a ratings version and a dynamic ad version of a video, according to one implementation of the present disclosure. Diagram 400 includes client 493 corresponding to media device 193, video API 440 provided by executable code 140, and video DB 450 corresponding to video database 150.

At 401, client 493 sends a request for a video to computing device 110 via video API 440. In some implementations, a user may initiate the request by selecting a video from a library of videos offered by a content provider, such as over-the-air broadcast network, a cable broadcast network, a satellite broadcast network, etc., and may be a video that is used to measure television ratings. Each video on in video DB 450 may include a unique identifier, such as an external unique episode identification (ID). External unique episode IDs may be unique identifiers for TV programs and movies, such as a TMS ID, and may allow client 493 to schedule data and on-demand video catalogs, such as video DB 450.

At 402, processor 120 of computing device 110 retrieves a list of active videos from video DB 150. The list may include videos with broadcast advertisements, such as ratings version 155, and videos with blank advertisement blocks, such as dynamic ad version 157. In some implementations, the list of active videos retrieved from video DB 450 may include multiple versions of the same video. For example, the list of active videos may include a ratings version of a first video for use before a threshold and a dynamic ad version of the first video for use after the threshold.

At 403, processor 120 of computing device 110 retrieves show configurations from video DB 150. In some implementations, show configurations may include a threshold for measuring ratings of the requested video, or the configurations may include a date range for showing a rating calculation version of the video, such as ratings version 155, and excluding dynamic advertisement versions, such as dynamic ad version 157.

At 404, processor 120 of computing device 110 applies the show configurations as a filter to the list of active videos retrieved from video DB 150. In some implementations, one or more of the videos of the list of active videos retrieved from video DB 150 may include broadcast advertisements. Video API 440 may filter out videos with broadcast advertisements, such as ratings version 155, from the list of active videos if the video has surpassed the date range set in the show configurations. For example, video API 440 may filter out a ratings version video, such as ratings version 155, having a date range or threshold of three days if the time elapsed since the video was first broadcast is greater than three days.

At 405, processor 120 of computing device 110 applies the show configurations to the list of active videos remaining after ratings version videos surpassing the date range set in the show configurations have been filtered. In some implementations, one or more of the videos of the list of active videos retrieved from video DB 150 may include dynamic advertisements. Processor 120 of computing device 110 may filter videos with dynamic advertisements, such as dynamic ad version 157, from the list of active videos if the video is within the date range set in the show configurations. For example, processor 120 of computing device 110 may filter a video, such as dynamic ad version 157, having a date range or threshold of three days if the time elapsed since the video was first broadcast is less than three days and the video includes dynamic advertisements.

At 406, processor 120 of computing device 110 checks the list of active videos after filtering to see if the requested video remains on the list of available videos. If neither a ratings version nor a dynamic ad version of the video remain on the list, video API 440 may proceed to 407, where processor 120 of computing device 110 retrieves a dynamic advertisement version, such as dynamic ad version 157, from video DB 150.

At 408, processor 120 of computing device 110 provides dynamic ad version 157 to client 493. In some implementations, providing the remaining videos to client 493 may include transmitting ratings version 155 and/or dynamic ad version 157 to client 493. Providing the remaining list of active videos to client 493 may include streaming ratings version 155 and/or dynamic ad version 157 to client 493. In other implementations, providing the remaining videos to client 440 may include transmitting a verifiable token to client 493, such as a URL to access the requested video. The URL may be a limited access URL and may expire after an access window, such as one minute, two minutes, five minute, etc.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
a non-transitory memory storing an executable code; and
a hardware processor executing the executable code to:
receive, at an application program interface (API), a request for a video from a client device over a computer network;
retrieve a list of active videos from a video database based on the request for the video, the list including ratings versions of the video and dynamic ad versions of the video;
in response to determining that the video database includes show configurations for the video:
retrieve the show configurations for the video from the video database, the show configurations including a threshold and a first date range for showing the ratings versions of the video and excluding the dynamic ad versions of the video; and
filter the list of the active videos using the show configurations to remove any of the ratings versions of the video that has a date surpassing the first date range, and remove any of the dynamic ad versions of the video that has a date within the first date range;
in response to determining that the video database does not include the show configurations for the video:
retrieve the device configurations for the client device from the video database, the device configurations including the threshold and a second date range for showing the ratings versions of the video and excluding the dynamic ad versions of the video; and
filter the list of the active videos using the device configurations to remove any of the ratings versions of the video that has a date surpassing the second date range, and remove any of the dynamic ad versions of the video that has a date within the second date range;
determine a time elapsed between an original broadcast of the video on a broadcast network and receiving the request for the video;
in response to the determined time elapsed between the original broadcast of the video on the broadcast network and receiving the request for the video not being greater than the threshold, provide via the API one of the ratings versions of the video from the filtered list over the computer network to a provider for display on the client device, wherein the one of the ratings versions comprises an identifier for tracking a number of views of the video, and further comprises baked-in ads, and wherein the threshold is a predetermined measure of time defining a period for reporting television ratings credit; and
in response to the determined time elapsed between the original broadcast of the video on the broadcast network and receiving the request for the video being greater than the threshold, provide via the API one of the dynamic ad versions of the video from the filtered list over the computer network to the provider for display on the client device, wherein the one of the dynamic ad versions includes no ads but blank spaces identifying to the provider where to insert new ads.

2. The system of claim 1, wherein the identifier comprises a Nielson watermark.

3. The system of claim 1, wherein providing the one of the ratings versions or the one of the dynamic ad versions of the video includes sending a limited-access URL for accessing the one of the ratings versions or the one of the dynamic ad versions of the video.

4. The system of claim 3, wherein the limited-access URL expires after an access window.

5. The system of claim 1, wherein the hardware processor executes the executable code to:
provide the one of the dynamic ad versions of the video as a fallback video.

6. The system of claim 1, wherein the provider of the video does not insert ads into the one of the dynamic ad versions of the video for customers with paid subscription.

7. The system of claim 1, wherein the hardware processor executes the executable code to:
insert a new advertisement in one of the blank spaces of the one of the dynamic ad versions of the video.

8. The system of claim 1, wherein the one of the dynamic ad versions is without the identifier for tracking the number of views of the video.

9. A method for use by a system having a hardware processor and a non-transitory memory storing an executable code, the method comprising:
receiving, at an application program interface (API) using the hardware processor executing the executable code, a request for a video from a client device over a computer network;
retrieving, using the hardware processor executing the executable code, a list of active videos from a video database based on the request for the video, the list including ratings versions of the video and dynamic ad versions of the video;
in response to determining that the database includes show configurations for the video:

retrieving the show configurations for the video from the database, the show configurations including a threshold and a first date range for showing the ratings versions of the video and excluding the dynamic ad versions of the video; and filtering the list of the active videos using the show configurations to remove any of the ratings versions of the video that has a date surpassing the first date range, and any of the dynamic ad versions of the video that has a date within the first date range;

in response to determining that the database does not include the show configurations for the video:

retrieving the device configurations for the client device from the database, the device configurations including the threshold and a second date range for showing the ratings versions of the video and excluding the dynamic ad versions of the video; and filtering the list of the active videos using the device configurations to remove any of the ratings versions of the video that has a date surpassing the second date range, and remove any of the dynamic ad versions of the video that has a date within the second date range;

determining, using the hardware processor executing the executable code, a time elapsed between an original broadcast of the video on a broadcast network and receiving the request for the video;

in response to the determined time elapsed between the original broadcast of the video on the broadcast network and receiving the request for the video not being greater than the threshold, providing, via the API using the hardware processor executing the executable code, a one of the ratings versions of the video from the filtered list over the computer network to a provider for display on the client device, wherein the one of the ratings versions comprises an identifier for tracking a number of views of the video, and further comprises baked-in ads, and wherein the threshold is a predetermined measure of time defining a period for reporting television ratings credit; and in response to the determined time elapsed between the original broadcast of the video on the broadcast network and receiving the request for the video being greater than the threshold, providing, via the API using the hardware processor executing the executable code, a one of the dynamic ad versions of the video from the filtered list over the computer network to the provider for display on the client device, wherein the one of the dynamic ad versions includes no ads but blank spaces identifying to the provider where to insert new ads.

10. The method of claim 9, wherein the identifier comprises a Nielson watermark for television ratings credit.

11. The method of claim 9, wherein providing the one of the ratings versions or the one of the dynamic ad versions of the video includes sending a limited-access URL for accessing the one of the ratings versions or the one of the dynamic ad versions of the video.

12. The method of claim 11, wherein the limited-access URL expires after an access window.

13. The method of claim 9, further providing, using the hardware processor, the one of the dynamic ad versions of the video as a fallback video.

14. The method of claim 9, wherein the provider of the video does not insert ads into the one of the dynamic ad versions of the video for customers with paid subscription.

15. The method of claim 9, further inserting, using the hardware processor, a new advertisement in one of the blank spaces of the one of the dynamic ad versions of the video.

16. The method of claim 9, wherein the one of the dynamic ad versions is without the identifier for tracking the number of views of the video.

* * * * *